(12) United States Patent
Chan

(10) Patent No.: US 10,997,944 B2
(45) Date of Patent: May 4, 2021

(54) VIDEO SWITCHING DEVICE AND SYSTEM AND METHOD FOR SWITCHING VIDEO SIGNAL

(71) Applicant: ATEN International Co., Ltd., New Taipei (TW)

(72) Inventor: Kai-Jui Chan, New Taipei (TW)

(73) Assignee: ATEN International Co., Ltd., New Taipei (TW)

( * ) Notice: Subject to any disclaimer, the term of this patent is extended or adjusted under 35 U.S.C. 154(b) by 0 days.

(21) Appl. No.: 16/691,207

(22) Filed: Nov. 21, 2019

(65) Prior Publication Data

US 2020/0175941 A1 Jun. 4, 2020

(30) Foreign Application Priority Data

Dec. 4, 2018 (TW) ................................. 107143534

(51) Int. Cl.
*G09G 5/00* (2006.01)
*G06F 3/14* (2006.01)
*H04N 7/12* (2006.01)
*H04N 7/10* (2006.01)

(52) U.S. Cl.
CPC .............. *G09G 5/006* (2013.01); *G06F 3/14* (2013.01); *H04N 7/104* (2013.01); *H04N 7/12* (2013.01); *G09G 2370/045* (2013.01)

(58) Field of Classification Search
CPC ........ H04N 21/47; H04N 21/485; H04N 5/50; H04N 5/775; H04N 5/44504; H04N 5/57; H04N 9/641; H04N 5/782; H04N 21/4263; H04N 21/43635; H04N 5/148; H04N 5/165; H04N 5/64; H04N 5/7755; H04N 21/4122; H04N 21/4135
See application file for complete search history.

(56) References Cited

U.S. PATENT DOCUMENTS 7,617,341 B2    11/2009  McClintock et al.
2007/0277214 A1 *  11/2007  Kim ................... H04N 21/4344
                                                725/131

* cited by examiner

*Primary Examiner* — Samira Monshi
(74) *Attorney, Agent, or Firm* — Chen Yoshimura LLP

(57) ABSTRACT

A switching device includes multimedia input interfaces for respectively receiving multiple multimedia signals, a switching unit electrically connected to the multimedia input interfaces, a multimedia output interface, an electrical characteristics modulator, and a controller. The switching unit outputs a selected multimedia signal according to a first control signal. The multimedia output interface includes a multimedia signal terminal for outputting the selected multimedia signals and a non-signal terminal. The electrical characteristics modulator changes an electrical characteristic of the non-signal terminal according to a second control signal. The controller is controlled to generate the first and the second control signals through a video switching method whereby the electrical characteristics modulator changes the electrical characteristic of the non-signal terminal thereby increasing compatibility between the switching device and a multimedia output device.

20 Claims, 8 Drawing Sheets

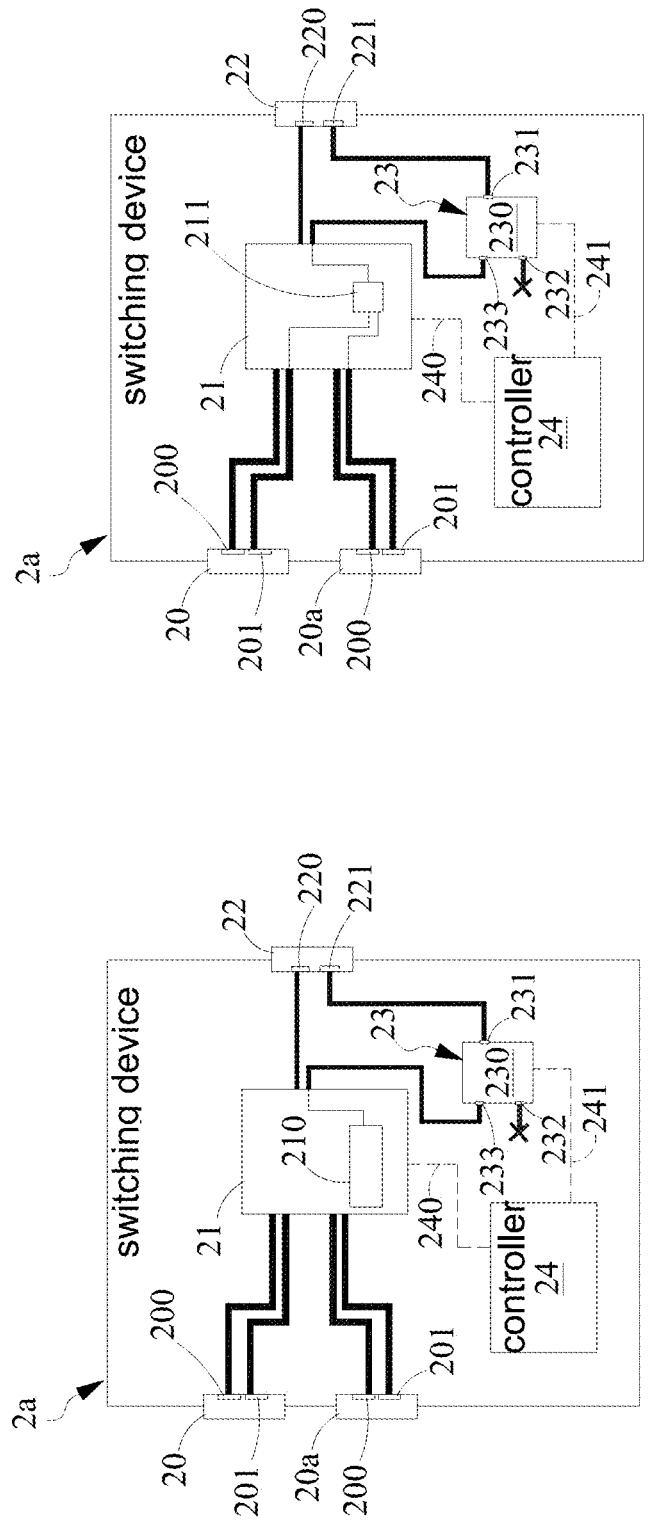

VIDEO SWITCHING DEVICE AND SYSTEM AND METHOD FOR SWITCHING VIDEO SIGNAL

BACKGROUND OF THE INVENTION

Field of the Invention

This invention relates to a signal switching method, device and system, and in particular, it relates to a switching device that facilitates smooth signal display by the display device when switching video signal sources, and related video switching system and method.

Description of Related Art

FIG. 1A schematically illustrates a conventional connection of a video source and sink using a DisplayPort interface. The video source 90 may be a computer, a video player such as a DVD player, or other devices that provides multimedia video signals, and the sink 91 is a display device or television. The video source 90 has a DisplayPort transmitter (DisplayPort TX), and the sink 91 has a DisplayPort receiver (DisplayPort RX). FIG. 1B illustrates a conventional DisplayPort interface. According to the DisplayPort standard, the interface has 20 pins, including main links (ML_lane 0-3) 92 formed by pins 1-12, an auxiliary channel (AUX_CH) 93 formed by pins 15-17, a hot plug detect channel (Hot_Plug) 94 formed by pin 18 for receiving hot plug detect (HPD) signal, power pins (DP_PWR) 19 and 20, and configuration (config) pins 13-14.

In conventional technologies, when the video source 90 is connected to the sink 91, the video source 90 receives a high voltage HPD signal from the sink 91, while the sink 91 detects the voltage on the auxiliary channel. Then, the video source 90 and sink 91 exchanges data (e.g., equipment data such as EDID data) via the auxiliary channel 93. Thereafter, the video source 90 outputs multimedia signal via the main links 92, so that the sink 91 can display the image and/or audio of the multimedia signal.

The DisplayPort standard defines the circuit design of the auxiliary channel, as shown in FIG. 1C. As shown in the figure, at the video source 90 side and the sink 91 side, the respective resistors on the positive and negative auxiliary channels (+/−AUX_CH) have different resistance values and electrical connections. When the video source 90 and sink 91 are connected, the previous high voltage level on the positive auxiliary channel (+AUX_CH) of the video source 90 becomes a low voltage level (due to voltage division), while the previous low voltage level on the negative auxiliary channel (−AUX_CH) of the sink 91 becomes a high voltage level. However, if the resistors of the video source 90 do not have appropriate resistance (e.g., 100 k ohm), or if the quality of the signal transmission wires is inadequate, it is possible that the voltage on the auxiliary channel cannot reach the required standard level, causing the video source 90 and the sink 91 to be unable to communicate data on the auxiliary channel.

To solve the above problem, in some systems, the sink 91 applies a high voltage level to another pin other than the main links 92, the auxiliary channel 93 and the HPD channel 94, for example, to the ground pin (GND), and detects the voltage change on that pin. When the sink 91 is connected to the video source 90, the voltage on such a pin will change from the high voltage level to a low voltage level; this allows the sink 91 to determine whether the video source 90 is connected, an enhances the accuracy of the determination.

DisplayPort may be employed in the field of switch devices, such as KVM (keyboard-video, mouse) switches or video matrix switches. In such a DisplayPort switch architecture, when the switch switches to another video source, the connecting wires do not go through a physical unplugging and re-plugging operation; only the channels that have signal communication (such as the main links 92, the auxiliary channel 93 and the HPD channel 94) are switched, while non-signal channels (such as channels other than the main links 92, the auxiliary channel 93 and the HPD channel 94) are not switched. Thus, it is possible that since the sink does not detect a voltage change in the other pin (e.g. GND as described above), it cannot determine that the source has been switched, causing a failure to output the video of the new source.

SUMMARY

Accordingly, the present invention is directed to a device, system and related method that substantially obviates one or more of the problems due to limitations and disadvantages of the related art.

Embodiments of the present invention provides a switching device and related video switching system and method which controls the change of electrical characteristics of a non-signal pin of the video output interface of the switching device, so that even when there is no physical unplugging and re-plugging of the transmission lines, electrical characteristics equivalent to those caused by physical unplugging and re-plugging of the transmission lines can be generated. This way, video signals can be smoothly output to the multimedia output devices connected to the switching device, such as displays or TVs.

One embodiment of the present invention provides a switching device, which includes a plurality of multimedia input interfaces, a first switching unit, a multimedia output interface, an electrical characteristics modulator, and a controller. Each of the plurality of multimedia input interfaces is configured to receive a respective one of a plurality of multimedia signals. The first switching unit is electrically connected to the plurality of multimedia input interfaces and configured to receive the respective plurality of multimedia signals; the first switching unit is configured to select one of the plurality of multimedia signals in response to a first control signal and to output the selected multimedia signal. The multimedia output interface is electrically connected to the first switching unit; the multimedia output interface includes multimedia signal terminals and a non-signal terminal, and is configured to output the selected multimedia signal via the multimedia signal terminals. The electrical characteristics modulator is electrically connected to the non-signal terminal and configured to change an electrical characteristic of the non-signal terminal in response to a second control signal. The controller is electrically connected to the first switching unit and the electrical characteristics modulator, configured to generate the first control signal and the second control signal, to control the electrical characteristics modulator to change the electrical characteristic of the non-signal terminal when the first switching unit selects the one of the plurality of multimedia signals.

In another aspect, the present invention provides a video switching method for controlling a switching device. The switching device includes a multimedia output interface which has multimedia signal terminals and a non-signal terminal. The video switching method includes: the switching device receiving a plurality of multimedia signals; selecting one of the plurality of multimedia signals in response to a first control signal and outputting the selected multimedia signal via the multimedia signal terminals; and when selecting and outputting the one of the plurality of multimedia signals, changing an electrical characteristic of the non-signal terminal in response to a second control signal.

In another aspect, the present invention provides a video switching system, which includes a plurality of video sources, a multimedia output device, and a switching device. Each of the plurality of video sources has a first multimedia signal interface and is configured to output a multimedia signal via the first multimedia signal interface. The multimedia output device has a second multimedia signal interface and an electrical characteristics detection circuit. The switching device includes a plurality of multimedia input interfaces, a first switching unit, a multimedia output interface, an electrical characteristics modulator, and a controller. Each of the plurality of multimedia input interfaces is electrically connected to one of the plurality of video sources via the corresponding first multimedia signal interface and configured to receive the corresponding multimedia signal. The first switching unit is electrically connected to the plurality of multimedia input interfaces and configured to receive the respective plurality of multimedia signals; the first switching unit is configured to select one of the plurality of multimedia signals in response to a first control signal and to output the selected multimedia signal. The multimedia output interface is electrically connected to the first switching unit and the second multimedia signal interface of the multimedia output device; the multimedia output interface includes multimedia signal terminals and a non-signal terminal, and is configured to output the selected multimedia signal via the multimedia signal terminals to the multimedia output device. The electrical characteristics modulator is electrically connected to the non-signal terminal and configured to change an electrical characteristic of the non-signal terminal in response to a second control signal. The controller is electrically connected to the first switching unit and the electrical characteristics modulator, configured to generate the first control signal and the second control signal, to control the electrical characteristics modulator to change the electrical characteristic of the non-signal terminal when the first switching unit selects the one of the plurality of multimedia signals. The electrical characteristics detection circuit of the multimedia output device is configured to detect the electrical characteristic of the non-signal terminal of the multimedia output interface via the second multimedia signal interface.

BRIEF DESCRIPTION OF THE DRAWINGS

FIGS. 4A and 4B are examples of a first switching unit achieving predefined electrical characteristics according to embodiments of the present invention.

DETAILED DESCRIPTION OF PREFERRED EMBODIMENTS

Figure 1A:
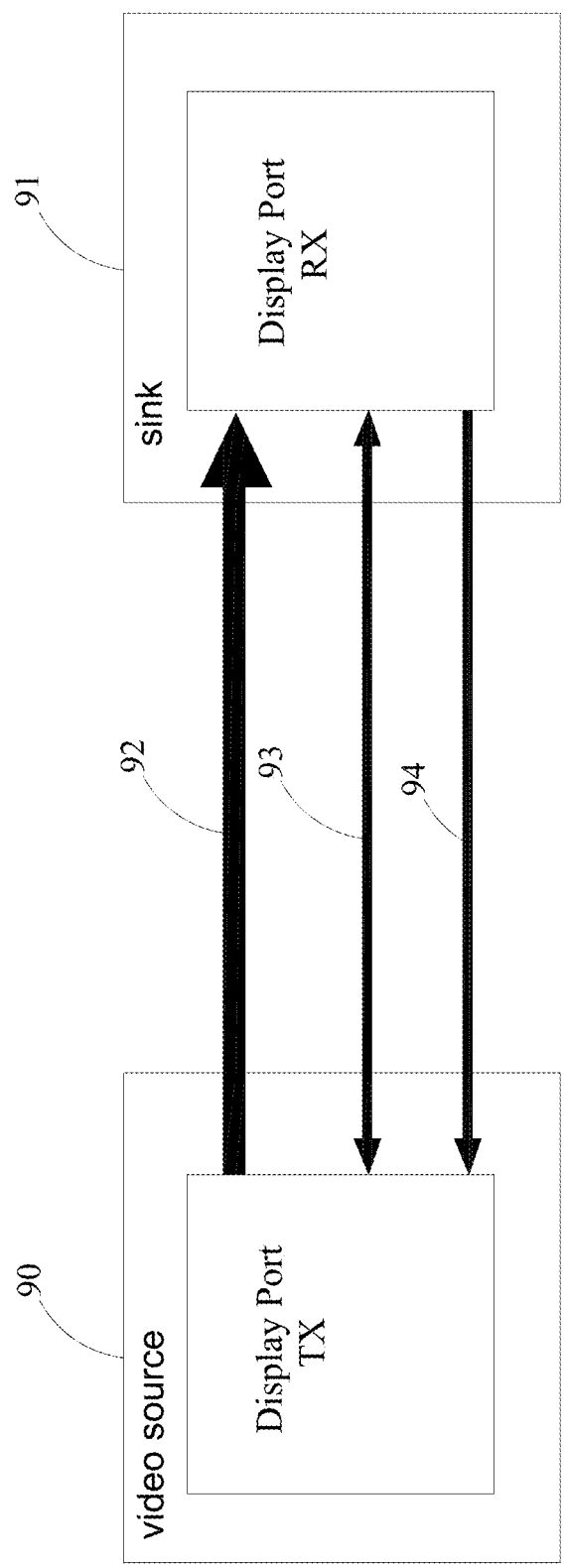
FIG. 1A schematically illustrates a conventional connection of a video source and sink using a DisplayPort interface.

Embodiments of the present invention are described below with reference to the drawings. The invention may be embodied in many other forms, and the descriptions below should not be interpreted to limit the scope of the invention. The embodiments are described here to provide a detailed description of the invention to those skilled in the art. In the drawings, like reference symbols are used to refer to like components. The embodiments are described below with reference to the drawings to explain the switching device and the switching system and method, but they do not limit the scope of the invention.

Figure 1B:
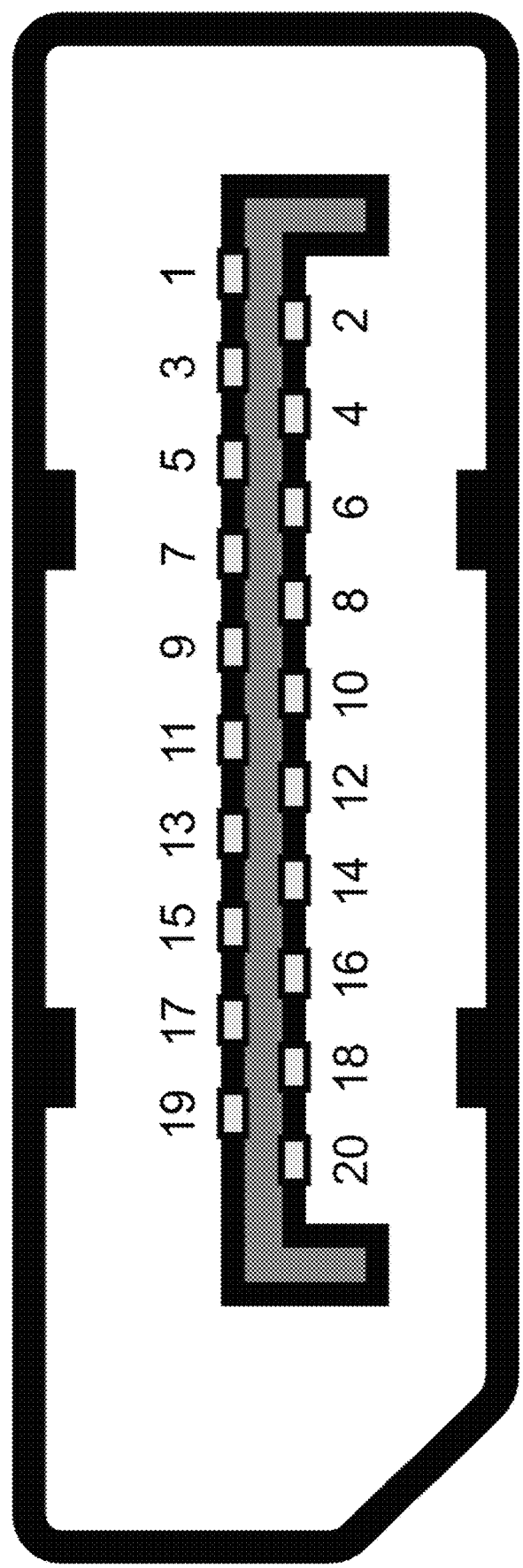
FIG. 1B illustrates a conventional DisplayPort interface.
Figure 1C:
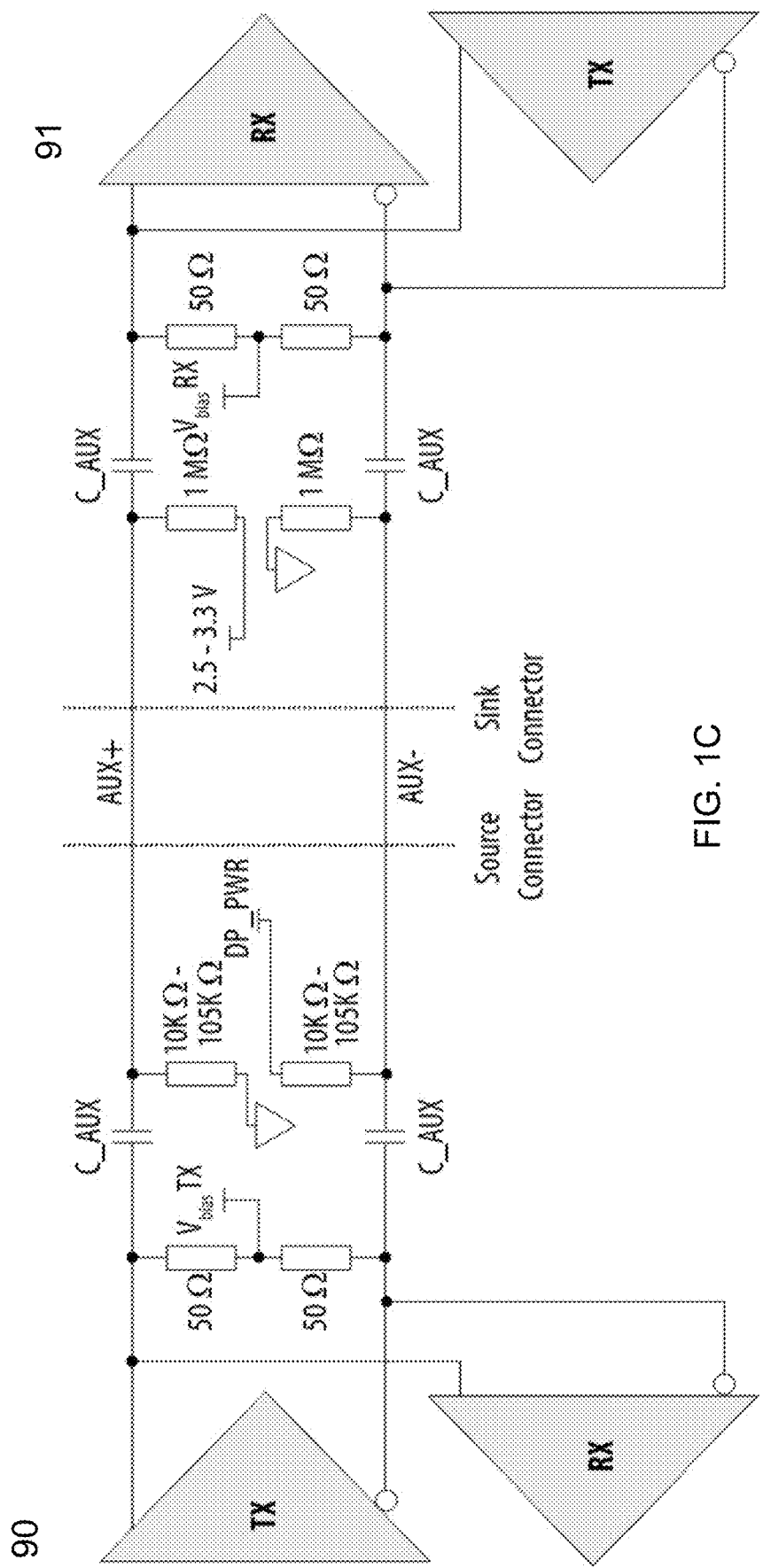
FIG. 1C illustrates a circuit diagram of an auxiliary channel and its detection method in a standard DisplayPort interface.
Figure 2:
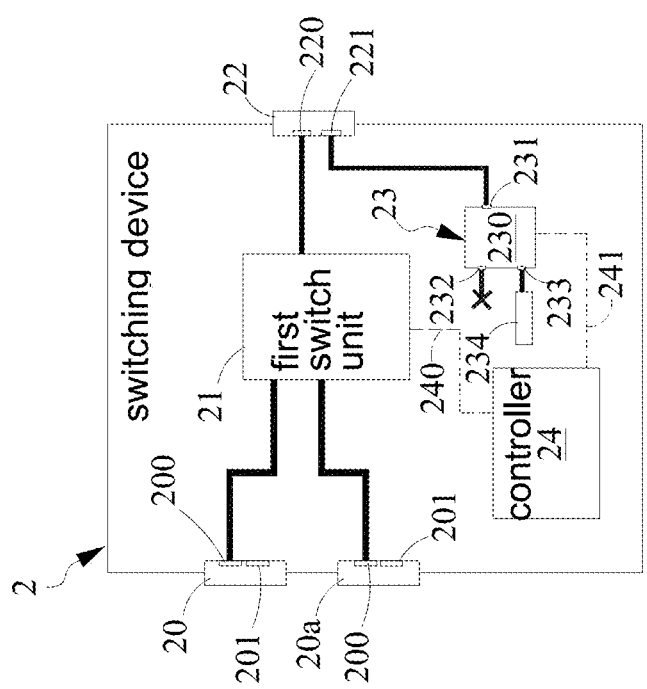
FIG. 2 schematically illustrates a switching device according to an embodiment of the present invention.

FIG. 2 schematically illustrates a switching device according to an embodiment of the present invention. In this embodiment, the switching device 2 includes multimedia input interfaces 20 and 20a, a first switching unit 21, a multimedia output interface 22, an electrical characteristics modulator 23, and a controller 24. The multimedia input interfaces 20 and 20a are configured to receive multimedia signals from corresponding video sources (not shown in the drawing). The multimedia input interfaces 20 and 20a may be DisplayPort of Mini DisplayPort interfaces. In this embodiment, the multimedia input interfaces 20 and 20a are DisplayPort interfaces as shown in FIG. 1B. It should be noted that the switching device 2 may be, without limitation, a KVM switch or a video matrix switch. Further, although the illustrated system has two multimedia input interfaces 20 and 20a and one multimedia output interface 22, the system is not limited to such numbers of components.

The first switching unit 21 is electrically connected to the multimedia input interfaces 20 and 20a and configured to receive multimedia signals. The first switching unit 21 outputs one of the multimedia signals to the multimedia output interface 22 in response to the first control signal 240. In this embodiment, the first switching unit 21 may be, for example, a multimedia signal switching chip, which selects one of the multimedia signals from the multimedia input interfaces 20 and 20a, and outputs it to the multimedia output interface 22. Each of the multimedia input interfaces 20 and 20a has multimedia signal terminals 200 and one or more first non-signal terminals 201. In this embodiment, the multimedia signal terminals 200 of each input interface include main link terminals, auxiliary link terminals, and a hot plug detect terminal (not specifically shown in the drawings), and the first non-signal terminals 201 of each input interface include one or more of a ground terminal GND, configuration terminals CONFIG. 1 and CONFIG. 2, and a return terminal RETURN (not specifically shown in the drawings) of the DisplayPort interface. In this embodiment, the first non-signal terminals 201 are bypassed to other circuits and are not electrically connected to the second non-signal terminals 221 of the multimedia output interface 22 via the first switching unit 21, but in other embodiments (such as in FIGS. 3 and 4B), the first non-signal terminals 201 may be selectively electrically connected to the second non-signal terminals 221 of the multimedia output interface 22 via the first switching unit 21, without limitation, as will be described later.

The multimedia output interface 22 is electrically connected to the first switching unit 21. The multimedia output interface 22 may be a DisplayPort of Mini DisplayPort interface. In this embodiment, the multimedia output interface 22 is a DisplayPort interface, but the invention is not limited to such. The multimedia output interface 22 has second multimedia signal terminals 220 and one or more second non-signal terminals 221. The second multimedia signal terminals 220 include main link terminals, auxiliary link terminals, and a hot plug detect terminal (not specifically shown in the drawings), and the one or more second non-signal terminals 221 include one or more of a ground terminal GND, configuration terminals CONFIG. 1 and CONFIG. 2, and a return terminal RETURN (not specifically shown in the drawings). In this embodiment, the second multimedia signal terminals 220 are electrically connected to the first switching unit 21, and configured to receive the multimedia signal at the multimedia signal terminals 200 of the multimedia input interface 20 or 20*a* that has been selected by the first switching unit 21.

The electrical characteristics modulator 23 is electrically connected to one of the one or more second non-signal terminals 221. In this embodiment, the electrical characteristics modulator 23 is electrically connected to the GND terminal of the second non-signal terminals 221. It should be noted that the one of the one or more second non-signal terminals that is electrically connected to the electrical characteristics modulator 23 is not limited to the GND terminal, but may alternatively be one of the CONFIG. 1 terminal, CONFIG. 2 terminal, and RETURN terminal, or any combination thereof, and the invention is not limited to any specific terminals. In the descriptions below, for convenience, the one of the one or more second non-signal terminals that is electrically connected to the electrical characteristics modulator 23 is simply referred to as "the second non-signal terminal 221". The second non-signal terminal 221 may be any terminal other than the main link terminals, auxiliary link terminals, and hot plug detect terminal. The electrical characteristics modulator 23 modifies the electrical characteristics of the second non-signal terminal 221 in response to the second control signal 241. In this embodiment, the electrical characteristics modulator 23 includes a second switching unit 230, which has a first signal terminal 231, a second signal terminal 232 and a third signal terminal 233. The second signal terminal 232 is in a floating state (an open circuit), while the third signal terminal 233 receives a predefined electrical characteristic. For example, the predefined electrical characteristic may be a current, or a voltage. In the embodiment where the predefined electrical characteristic is a voltage, it may be a ground (GND) voltage or a high voltage such as 3.3 V, without limitation. In this particular embodiment, the predefined electrical characteristic is the ground voltage.

The first signal terminal 231 is electrically connected to the second non-signal terminal 221 and the third signal terminal 233. Because the first signal terminal 231 is electrically connected to the third signal terminal 233, the second non-signal terminal 221 is at the ground voltage. When the first switching unit 21 selectively switches to one of the multimedia input interfaces 20 and 20*a*, for example, switches from multimedia input interface 20 to multimedia input interface 20*a*, in response to the second control signal 241, the second switching unit 230 electrically disconnects the first signal terminal 231 from the third signal terminal 233 and electrically connects the first signal terminal 231 to the second signal terminal 232. Thus, the second non-signal terminal 221 is in the floating stage. Then, the second switching unit 230 electrically disconnects the first signal terminal 231 from the second signal terminal 232 and electrically connects the first signal terminal 231 back to the third signal terminal 233, so that the second non-signal terminal 221 goes back to the ground state. From the above descriptions, it can be seen that when the switching device 2 switches video sources, by using the electrically disconnecting then re-connecting method to substantively change the electrical characteristic of the second non-signal terminal 221, even though the wires are not physically unplugged or re-plugged, an unplugging and re-plugging effect is generated at the sink side. This enhances the reliability of the video output at the sink side. It should be noted that the above actions of the second switching unit 230 are performed only once when the video switching action of the switching device 2 occurs. To accomplish this, the second control signal 241 is generated once immediately or shortly after the first control signal 240 is generated.

The controller 24 is electrically connected to the first switching unit 21 and the electrical characteristics modulator 23. The controller 24 is configured to generate a first control signal 240 and a second control signal 241, for controlling the electrical characteristics modulator 23 so that the latter modifies the electrical characteristic of the second non-signal terminal 221 when the first switching unit 21 switches to one of the multimedia signals.

Figure 3:
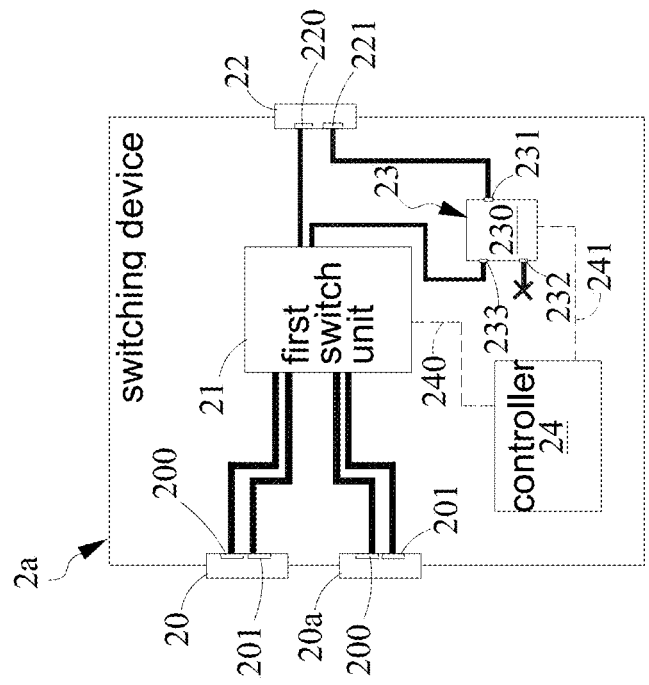
FIG. 3 schematically illustrates a switching device according to another embodiment of the present invention.

FIG. 3 schematically illustrates a switching device according to another embodiment of the present invention. In this embodiment, the switching device 2*a* is similar to the switching device of FIG. 2, with a main difference being, in this embodiment, both the multimedia signal terminals 200 and the first non-signal terminals 201 of each of the multimedia input interfaces 20 and 20*a* are electrically connected to the first switching unit 21. The third signal terminal 233 of the second switching unit 230 of the electrical characteristics modulator 23 is electrically connected to the first switching unit 21 to receive the predefined electrical characteristic. Based on the multimedia signal selected by the switching device 2*a*, one of the first non-signal terminals 201 of one of the multimedia input interfaces 20 and 20*a* will be electrically connected to the second non-signal terminal 221 so that the two will have the same voltage, i.e. the predefined electrical characteristic. In this embodiment, the predefined electrical characteristic is, without limitation, a ground voltage. Other aspects of this embodiment are similar to the earlier embodiment. Similar to the earlier embodiment, when the switching device 2*a* selectively switches to one of the multimedia signals, in response to the second control signal 241, the second switching unit 230 electrically disconnects the first signal terminal 231 from the third signal terminal 233 and electrically connects the first signal terminal 231 to the second signal terminal 232; then, the second switching unit 230 electrically disconnects the first signal terminal 231 from the second signal terminal 232 and electrically connects the first signal terminal 231 back to the third signal terminal 233, so as to change the electrical characteristic of the second non-signal terminal 221.

It should be noted that in the switching device 2*a* shown in FIG. 3, because the third signal terminal 233 is electrically connected to the first switching unit 21, the manner of providing the predefined electrical characteristic for the third signal terminal 233 may be as illustrated in FIGS. 4A and 4B. In the embodiment shown in FIG. 4A, the manner of providing the predefined electrical characteristic is to provide, within the first switching unit 21, an electrical circuit 210 which generates the predefined electrical characteristic. For example, the circuit 210 may be a grounding circuit that provides a ground voltage, a high voltage generator circuit formed of a voltage source and a resistor. The level of the high voltage is dependent on the circuit design or the voltage level of voltage source. The appropriate electrical characteristic may be generated based on practical need. Further, in another embodiment, shown in FIG. 4B, the first switching unit 21 has a switching element 211, configured to electrically connect the third signal terminal 233 to one or more of the first non-signal terminals 201 of the multimedia input interface 20 or 20a that has been selected. This way, the first non-signal terminals 201 provide the ground voltage or high voltage level of the video source to the second non-signal terminal 221 which is electrically connected to the third signal terminal 233.

Figure 5:
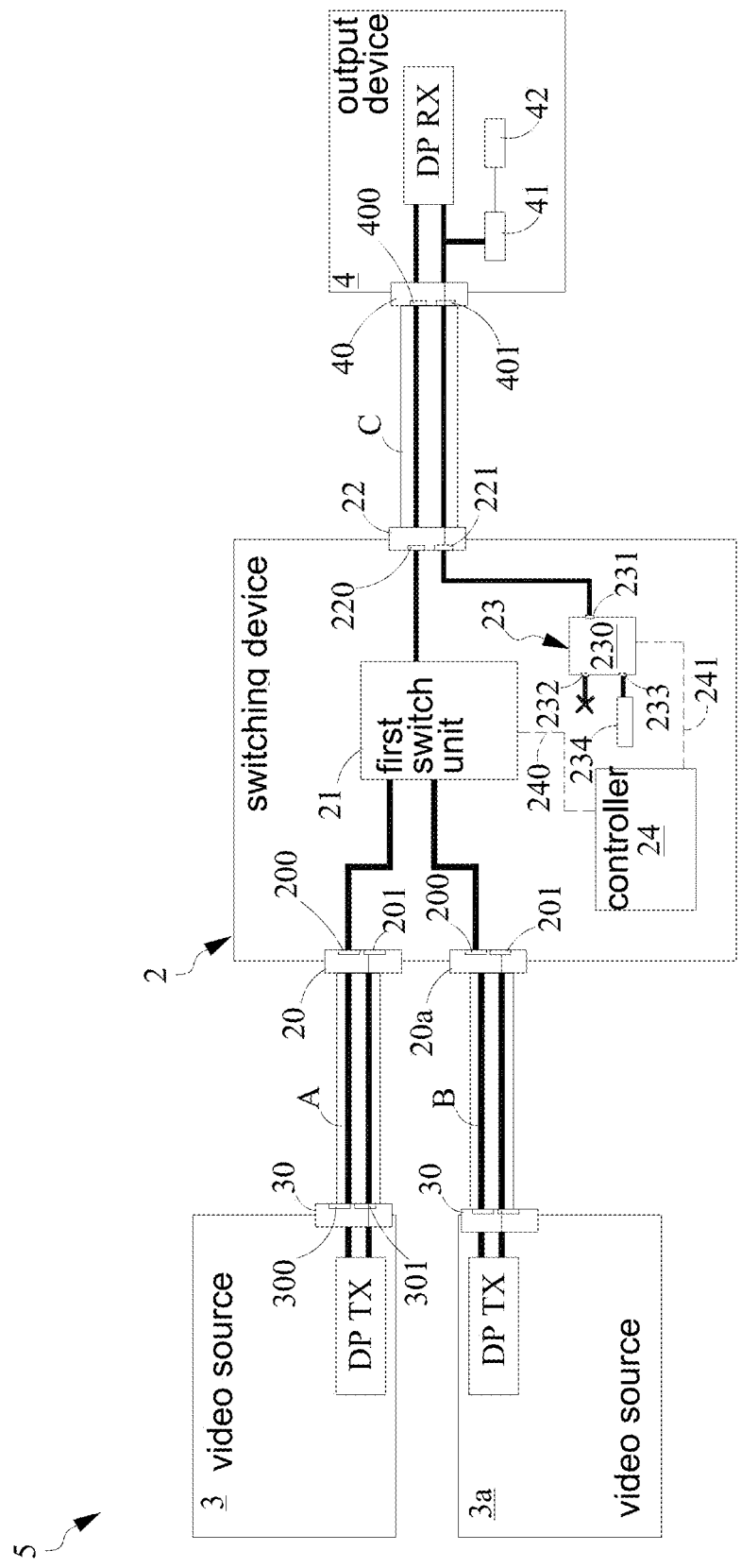
FIG. 5 schematically illustrates a video switching system according to an embodiment of the present invention.

FIG. 5 schematically illustrates a video switching system according to an embodiment of the present invention, which employs the switching device 2 of FIG. 2. The switching system 5 includes multiple video sources 3 and 3a, the switching device 2, and a multimedia output device 4. The video sources 3 and 3a may be, without limitation, computers, video players such as DVD players, etc. Each of the video sources 3 and 3a has a multimedia output interface 30, electrically connected to the multimedia input interfaces 20 or 20a of the switching device 2 by video transmission cables A or B. In this embodiment, each of the video transmission cables A and B has DisplayPort interfaces at both ends to electrically connect to the multimedia output interface 30 of the video sources 3 or 3a and the multimedia input interfaces 20 or 20a of the switching device 2. The multimedia output interface 22 of the switching device 2 is electrically connected to the multimedia input interface 40 of the multimedia output device 4 via a video transmission cable C which is equipped with DisplayPort interfaces at both ends. The multimedia output device 4 may be, without limitation, a display device or television. The switching system 5 may use input interfaces (not shown) such as keys or touch panel provided on the switching device 2, or use the video sources 3 and 3a connected to the switching device 2, to generate a signal for controlling the first switching unit 21. This signal causes the first switching unit 21 to selectively output multimedia signals from any one of the video sources 3 and 3a to the multimedia output device 4 to display audio and/or video data. Although the above descriptions uses the DisplayPort interface as an example, the invention is not limited to such, and those skilled in the art can select appropriate transmission interfaces based on need to implement embodiments of the present invention.

It should be noted that the first multimedia signal terminals 200 and first non-signal terminals 201 of the multimedia input interfaces 20 and 20a are respectively electrically connected to the third multimedia signal terminals 300 and third non-signal terminals 301 of the multimedia output interface 30 of the video sources 3 and 3a. The multimedia input interface 40 of the multimedia output device 4 has fourth multimedia signal terminals 400 and fourth non-signal terminals 401, where the fourth multimedia signal terminals 400 are electrically connected to the second multimedia signal terminals 220 of the multimedia output interface 22 of the switching device 2, and the fourth non-signal terminals 401 are electrically connected to the second non-signal terminals 221 of the multimedia output interface 22. Note that there may be one or more fourth non-signal terminals 401 corresponding connected to the one or more second non-signal terminals 221; the description below concerns one of the one or more fourth non-signal terminals 401 (referred to as "the fourth non-signal terminal 401" for convenience) that is electrically connected to the one of the second non-signal terminals 221 that is connected to the electrical characteristics modulator 23.

The multimedia output device 4 includes an electrical characteristics detection circuit 41, an arithmetic processor 42, and a DisplayPort signal receiver (DP RX). The electrical characteristics detection circuit 41 is electrically connected to the fourth non-signal terminal 401 and the arithmetic processor 42, to obtain the electrical characteristics on the fourth non-signal terminal 401. The arithmetic processor 42 determines whether the electrical characteristics on the fourth non-signal terminal 401 has changed. In this embodiment, each of the video sources 3 and 3a further includes a DisplayPort signal transmitter (DP TX), and the multimedia output device 4 further includes a DisplayPort signal receiver (DP RX), where the DP TX and the DP RX are electrically connected to each other via the system architecture shown in FIG. 5, and communicate signals with each other to encode and decode the DisplayPort format multimedia signal. The DisplayPort format and encoding/decoding are well known and will not be described in detail here.

Figure 6:
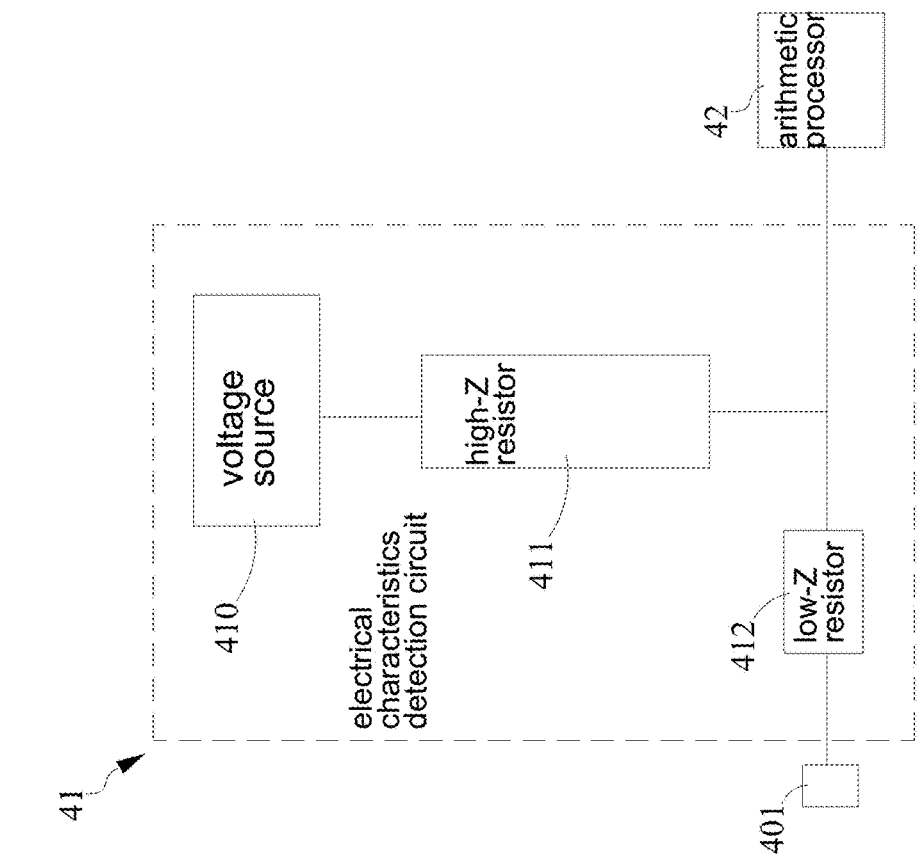
FIG. 6 schematically illustrates an electrical characteristics detection circuit according to an embodiment of the present invention.

FIG. 6 schematically illustrates the structure of the electrical characteristics detection circuit according to an embodiment of the present invention. In this embodiment, the electrical characteristics detection circuit 41 includes a voltage source 410, a high-impedance resistor 411, and a low-impedance resistor 412. Those skilled in the art can determine the resistance values of the high-impedance resistor 411 and low-impedance resistor 412 based on need. The high-impedance resistor 411 is electrically connected to the voltage source 410; the low-impedance resistor 412 is electrically connected at one end to the fourth non-signal terminal 401, and at the other end to the high-impedance resistor 411 and the arithmetic processor 42.

Figure 7:
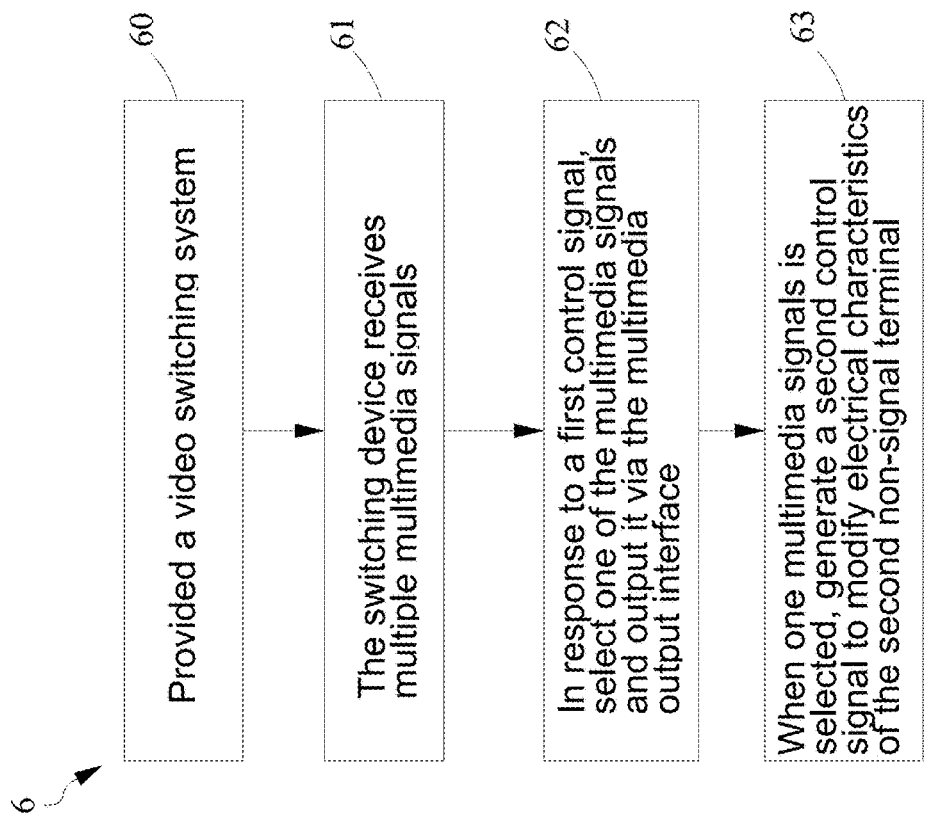
FIG. 7 schematically illustrates a video switching method according to an embodiment of the present invention.

A video switching method according to an embodiment of the present invention is described below with reference to the flow chart in FIG. 7. The method 6 includes steps 60, 61, 62, and 63. In step 60, a video switching system is provided. As an example, the switching system may be the switching system 5 shown in FIG. 5. In step 61, the switching device 2 receives multiple multimedia signals. With reference to FIG. 5, in this step, multiple video sources 3 and 3a are respectively connected to the multimedia input interfaces 20 and 20a of the switching device 2 to receive the multimedia signals. Then, in step 62, in response to a first control signal, one of the multimedia signals is selected and output via the multimedia output interface. In this step, when the user wishes to switch to one of the video sources 3 and 3a, for example, to switch from video source 3 to video source 3a, in one embodiment, the user may operate a button or a touch panel or a hot key on the switching device 2, to cause the controller 24 to generate a first control signal 240. In response to receiving the first control signal 240, the first switching unit 21 switches from the current video source 3 to the video source 3a.

It should be noted that, when switching the video sources, there is no physical unplugging and re-plugging actions on the transmission cable C between the multimedia output device 4 and the switching device 2. Therefore, to ensure that the multimedia output device 4 can smoothly output the video images, step 63 is performed after 62: when one of the multimedia signals is selected to be output, a second control signal is generated to cause the electrical characteristics of the second non-signal terminal to be modified. In step 63, as described earlier with reference to FIG. 5, the controller 24 generates the second control signal 241 to control the electrical characteristics modulator 23 to change the electrical characteristics of the second non-signal terminal 221. Before the electrical characteristics modulator 23 receives the second control signal 241, the third signal terminal 233 is electrically connected to the second non-signal terminal 221 of the multimedia output interface 22 via the first signal terminal 231 of the second switching unit 230, so that the second non-signal terminal 221 transmits the predefined electrical characteristics of the third signal terminal 233 via the transmission cable C to the fourth non-signal terminal 401 of the multimedia input interface 40 of the multimedia output device 4. In this embodiment, the GND pin of the fourth non-signal terminals 401 is used as the medium to receive the predefined electrical characteristics. The electrical characteristics detection circuit 41 detects the predefined characteristic and provides it to the arithmetic processor 42. It should be noted that the pin that can be used as the medium to receive the predefined electrical characteristics is not limited to the GND pin; other pins such as CONFIG. 1, CONFIG. 2, RETURN, etc. may alternatively be used.

In response to receiving the second control signal 241, the second switching unit 230 electrically disconnects the third signal terminal 233 from the first signal terminal 231, and electrically connects the second signal terminal 232 to the first signal terminal 231. As described earlier, in this embodiment, the second signal terminal 232 is in a floating state, so that the fourth non-signal terminal 401 is now also in a floating state. The electrical characteristics detection circuit 41 detects that the fourth non-signal terminal 401 is in a floating state and provides that information to the arithmetic processor 42. The arithmetic processor 42 accordingly determines that the electrical characteristics of the fourth non-signal terminal 401 have changed, and thereby determines that the transmission cable C experienced unplugging and re-plugging events or equivalent. Based on this, the multimedia output device 4 performs data exchanges required by the DisplayPort standard, and displays the received image. By the steps 60-63, when the switching device 2 selectively switches to a different video source 3 or 3a, from the standpoint of the multimedia output device 4, the transmission cable C presents signals that are equivalent to unplugging and re-plugging events of the cable. Therefore, this improves reliability of the displayed image, and improves the compatibility between the switching device and the multimedia output devices.

Figure 8:
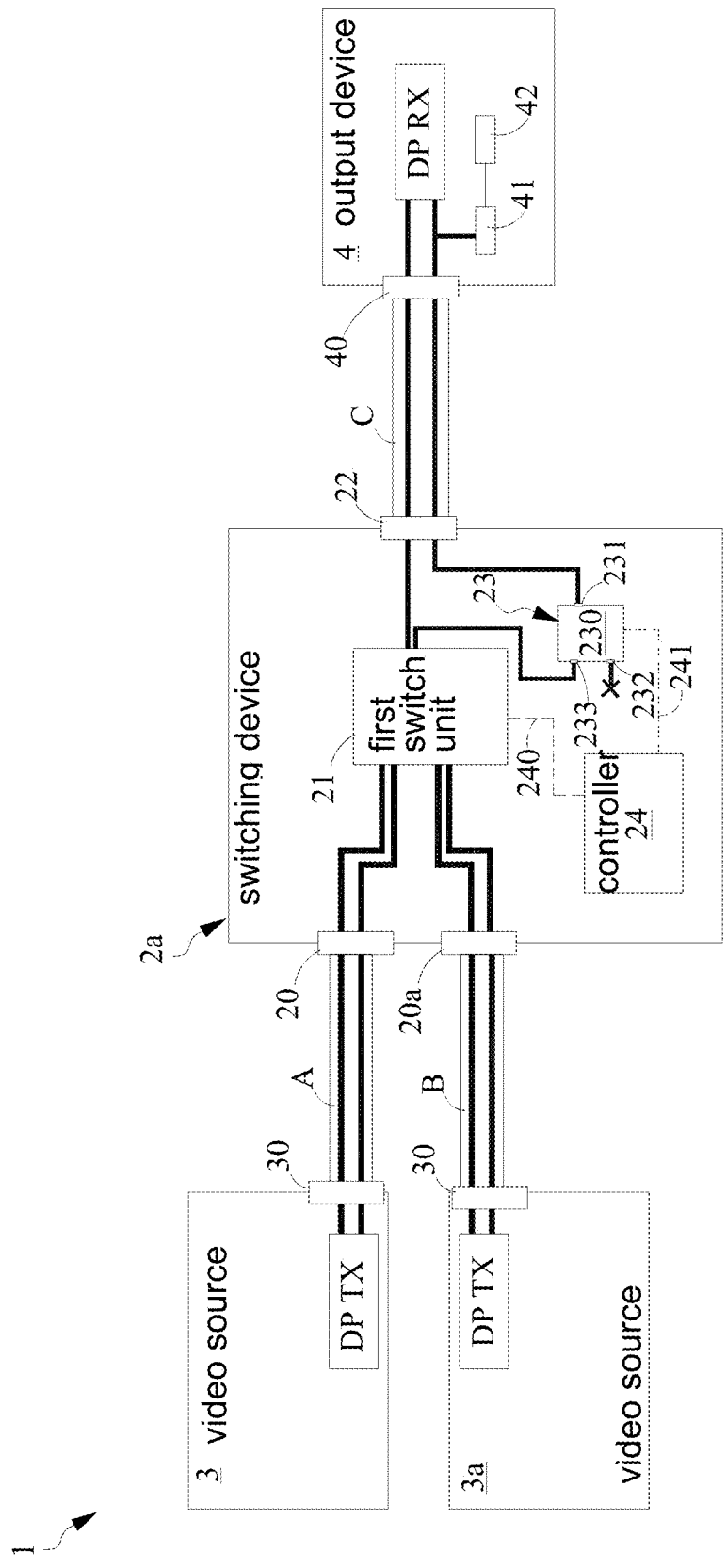
FIG. 8 schematically illustrates a video switching system according to another embodiment of the present invention.

FIG. 8 schematically illustrates a video switching system according to another embodiment of the present invention. In this embodiment, the switching device 2a of the switching system is the switching device shown in FIG. 3. The video sources 3 and 3a and multimedia output device are similar to those shown in FIG. 5. One difference is that in the embodiment of FIG. 8, when the switching device 2a is switching between video sources 3 and 3a, the operation of the electrical characteristics modulator 23 is different from that of FIG. 5. In the embodiment of FIG. 8, because the electrical characteristics modulator 23 is electrically connected to the first switching unit 21, before the second switching unit 230 receives the second control signal 241, the predefined electrical characteristics of the third signal terminal 233 is from the first switching unit 21, such as that shown in FIGS. 4A and 4B. In response to receiving the second control signal 241, the second switching unit 230 first electrically disconnects the first signal terminal 231 from the third signal terminal 233, and electrically connects the first signal terminal 231 to the second signal terminal 232, and then, electrically disconnects the first signal terminal 231 from the second signal terminal 232 and electrically connects the first signal terminal 231 to the third signal terminal 233. These actions change the electrical characteristics of the second non-signal terminal 221, and such changes in the electrical characteristics are detected by the electrical characteristics detection circuit 41 of the multimedia output device 4. The arithmetic processor 42 determines, based on the detection result, that there were unplugging and re-plugging events on the transmission cable C. The detection and processing have been described earlier and is not repeated here.

To summarize, in embodiments of the present invention, when the switching device selects and switches between different video sources, the electrical characteristics modulator is used to modify the electrical characteristics of the second non-signal terminals, so that from the standpoint of the multimedia output device (sink), the transmission cable presents signals that are equivalent to cable unplugging and re-plugging events. This enhances the reliability of the video output at the sink, and improves the compatibility between the source and the sink (e.g. display device).

The various components of the system described above may be implemented by electrical circuitry including logic circuits, and/or processors which execute computer executable program code stored in computer readable non-volatile memories.

It will be apparent to those skilled in the art that various modification and variations can be made in the video switching device, system and method of the present invention without departing from the spirit or scope of the invention. Thus, it is intended that the present invention cover modifications and variations that come within the scope of the appended claims and their equivalents.

What is claimed is:

1. A switching device, comprising:
a plurality of multimedia input interfaces, each configured to receive a respective one of a plurality of multimedia signals;
a first switching unit, electrically connected to the plurality of multimedia input interfaces and configured to receive the respective plurality of multimedia signals, wherein the first switching unit is configured to select one of the plurality of multimedia signals in response to a first control signal and to output the selected multimedia signal;
a multimedia output interface, electrically connected to the first switching unit, wherein the multimedia output interface includes multimedia signal terminals and a non-signal terminal, and is configured to output the selected multimedia signal via at least some of the multimedia signal terminals;
an electrical characteristics modulator, electrically connected to the non-signal terminal and configured to change an electrical characteristic of the non-signal terminal in response to a second control signal, wherein the electrical characteristic of the non-signal terminal is a voltage or a current; and
a controller, electrically connected to the first switching unit and the electrical characteristics modulator, configured to generate the first control signal and the second control signal, to control the electrical characteristics modulator to change the electrical characteristic of the non-signal terminal when the first switching unit selects the one of the plurality of multimedia signals.

2. The switching device of claim 1, wherein the electrical characteristics modulator includes a second switching unit which has a first signal terminal, a second signal terminal and a third signal terminal, wherein the first signal terminal is electrically connected to the non-signal terminal and the third signal terminal, the second signal terminal is in a floating state, and the third signal terminal receives a predefined electrical characteristic, wherein the second switching unit is configured to, in response to the second control signal, electrically disconnect the first signal terminal from the third signal terminal and electrically connect the first signal terminal to the second signal terminal, and then electrically disconnect the first signal terminal from the second signal terminal and electrically connect the first signal terminal to the third signal terminal, thereby to change the electrical characteristic of the non-signal terminal.

3. The switching device of claim 2, wherein the plurality of multimedia input interfaces and the multimedia output interface are respectively DisplayPort interfaces, and wherein the non-signal terminal is a ground terminal GND, a first configuration terminal CONFIG. 1, a second configuration terminal CONFIG. 2, or a return terminal RETURN.

4. The switching device of claim 2, wherein the predefined electrical characteristic is a ground voltage or a predefined high voltage.

5. The switching device of claim 1, wherein the electrical characteristics modulator includes a second switching unit which has a first signal terminal, a second signal terminal and a third signal terminal, wherein the first signal terminal is electrically connected to the non-signal terminal and the third signal terminal, the second signal terminal is in a floating state, and the third signal terminal is electrically connected to the first switching unit to receive a predefined electrical characteristic, wherein the second switching unit is configured to, in response to the second control signal, electrically disconnect the first signal terminal from the third signal terminal and electrically connect the first signal terminal to the second signal terminal, and then electrically disconnect the first signal terminal from the second signal terminal and electrically connect the first signal terminal to the third signal terminal, thereby to change the electrical characteristic of the non-signal terminal.

6. The switching device of claim 5, wherein the plurality of multimedia input interfaces and the multimedia output interface are respectively DisplayPort interfaces, and wherein the non-signal terminal is a ground terminal GND, a first configuration terminal CONFIG. 1, a second configuration terminal CONFIG. 2, or a return terminal RETURN.

7. The switching device of claim 5, wherein the predefined electrical characteristic is a predefined voltage or a predefined current.

8. A video switching method for controlling a switching device, the switching device including a multimedia output interface which has multimedia signal terminals and a non-signal terminal, the method comprising:
the switching device receiving a plurality of multimedia signals;
selecting one of the plurality of multimedia signals in response to a first control signal and outputting the selected multimedia signal via at least some of the multimedia signal terminals; and
when selecting and outputting the one of the plurality of multimedia signals, changing an electrical characteristic of the non-signal terminal in response to a second control signal, wherein the electrical characteristic of the non-signal terminal is a voltage or a current.

9. The video switching method of claim 8, wherein the step of changing the electrical characteristic of the non-signal terminal includes:
before receiving the second control signal, electrically connecting the non-signal terminal to a predefined electrical characteristic;
in response to receiving the second control signal, electrically disconnecting the non-signal terminal from the predefined electrical characteristic and electrically connecting the non-signal terminal to a floating signal; and
thereafter, electrically disconnecting the non-signal terminal from the floating signal and electrically connecting the non-signal terminal to the predefined electrical characteristic.

10. The video switching method of claim 9, wherein the multimedia output interface is a DisplayPort interface, and wherein the non-signal terminal is a ground terminal GND, a first configuration terminal CONFIG. 1, a second configuration terminal CONFIG. 2, or a return terminal RETURN.

11. The video switching method of claim 9, wherein the predefined electrical characteristic is a ground voltage or a predefined high voltage.

12. The video switching method of claim 8, wherein the switching device includes a plurality of multimedia input interfaces and a first switching unit electrically connected to the plurality of multimedia input interfaces, wherein the step of receiving the plurality of multimedia signals is respectively performed by the plurality of multimedia input interfaces, wherein the step of selecting one of the plurality of multimedia signals is performed by the first switching unit, and wherein the step of changing the electrical characteristic of the non-signal terminal includes:
before receiving the second control signal, electrically connecting the non-signal terminal to the first switching unit to receive a predefined electrical characteristic;
in response to receiving the second control signal, electrically disconnecting the non-signal terminal from the first switching unit and electrically connecting the non-signal terminal to a floating signal; and
thereafter, electrically disconnecting the non-signal terminal from the floating signal and electrically connecting the non-signal terminal to the first switching unit to receive the predefined electrical characteristic.

13. The video switching method of claim 12, wherein the plurality of multimedia input interfaces and the multimedia output interface are respectively DisplayPort interfaces, and wherein the non-signal terminal is a ground terminal GND, a first configuration terminal CONFIG. 1, a second configuration terminal CONFIG. 2, or a return terminal RETURN.

14. The video switching method of claim 12, wherein the predefined electrical characteristic is a predefined voltage or a predefined current.

15. A video switching system, comprising:
a plurality of video sources, wherein each video source has a first multimedia signal interface and is configured to output a multimedia signal via the first multimedia signal interface;
a multimedia output device having a second multimedia signal interface, and further having an electrical characteristics detection circuit; and
a switching device, including:
a plurality of multimedia input interfaces, each electrically connected to one of the plurality of video sources via the corresponding first multimedia signal interface and configured to receive the corresponding multimedia signal;
a first switching unit, electrically connected to the plurality of multimedia input interfaces and configured to receive the respective plurality of multimedia signals, wherein the first switching unit is configured to select one of the plurality of multimedia signals in response to a first control signal and to output the selected multimedia signal;

a multimedia output interface, electrically connected to the first switching unit and the second multimedia signal interface of the multimedia output device, wherein the multimedia output interface includes multimedia signal terminals and a non-signal terminal, and is configured to output the selected multimedia signal via at least some of the multimedia signal terminals to the multimedia output device;

an electrical characteristics modulator, electrically connected to the non-signal terminal and configured to change an electrical characteristic of the non-signal terminal in response to a second control signal, wherein the electrical characteristic of the non-signal terminal is a voltage or a current; and a controller, electrically connected to the first switching unit and the electrical characteristics modulator, configured to generate the first control signal and the second control signal, to control the electrical characteristics modulator to change the electrical characteristic of the non-signal terminal when the first switching unit selects the one of the plurality of multimedia signals, and wherein the electrical characteristics detection circuit of the multimedia output device is configured to detect the electrical characteristic of the non-signal terminal of the multimedia output interface via the second multimedia signal interface.

16. The video switching system of claim 15, wherein the electrical characteristics modulator includes a second switching unit which has a first signal terminal, a second signal terminal and a third signal terminal, wherein the first signal terminal is electrically connected to the non-signal terminal and the third signal terminal, the second signal terminal is in a floating state, and the third signal terminal receives a predefined electrical characteristic, wherein the second switching unit is configured to, in response to the second control signal, electrically disconnect the first signal terminal from the third signal terminal and electrically connect the first signal terminal to the second signal terminal, and then electrically disconnect the first signal terminal from the second signal terminal and electrically connect the first signal terminal to the third signal terminal, thereby to change the electrical characteristic of the non-signal terminal.

17. The video switching system of claim 16, wherein the plurality of multimedia input interfaces and the multimedia output interface are respectively DisplayPort interfaces, and wherein the non-signal terminal is a ground terminal GND, a first configuration terminal CONFIG. 1, a second configuration terminal CONFIG. 2, or a return terminal RETURN.

18. The video switching system of claim 16, wherein the predefined electrical characteristic is a ground voltage or a predefined high voltage.

19. The video switching system of claim 15, wherein the electrical characteristics modulator includes a second switching unit which has a first signal terminal, a second signal terminal and a third signal terminal, wherein the first signal terminal is electrically connected to the non-signal terminal and the third signal terminal, the second signal terminal is in a floating state, and the third signal terminal is electrically connected to the first switching unit to receive a predefined electrical characteristic, wherein the second switching unit is configured to, in response to the second control signal, electrically disconnect the first signal terminal from the third signal terminal and electrically connect the first signal terminal to the second signal terminal, and then electrically disconnect the first signal terminal from the second signal terminal and electrically connect the first signal terminal to the third signal terminal, thereby to change the electrical characteristic of the non-signal terminal.

20. The video switching system of claim 19, wherein the plurality of multimedia input interfaces and the multimedia output interface are respectively DisplayPort interfaces, and wherein the non-signal terminal is a ground terminal GND, a first configuration terminal CONFIG. 1, a second configuration terminal CONFIG. 2, or a return terminal RETURN.

* * * * *